United States Patent

Okumura et al.

[11] Patent Number: 5,157,235
[45] Date of Patent: Oct. 20, 1992

[54] LASER MARKING SYSTEM

[75] Inventors: Kiyoshi Okumura; Kazuhiko Nishimura; Minoru Fujimoto; Hiroo Ohkawa; Kazuo Mera; Shigeo Shiono, all of Hitachi, Japan

[73] Assignee: Hitachi, Ltd., Tokyo, Japan

[21] Appl. No.: 658,585

[22] Filed: Feb. 21, 1991

[30] Foreign Application Priority Data

Feb. 28, 1990 [JP] Japan .................. 2-045422

[51] Int. Cl.$^5$ .......................................... B23K 26/00
[52] U.S. Cl. ......................... 219/121.68; 219/121.74; 219/121.78
[58] Field of Search ............... 219/121.74, 121.68, 219/121.75, 121.78

[56] References Cited

U.S. PATENT DOCUMENTS

| | | | |
|---|---|---|---|
| 4,734,558 | 3/1988 | Nakano et al. | 219/121.73 |
| 4,818,835 | 4/1989 | Kuwabara et al. | 219/121.6 |
| 4,940,881 | 7/1990 | Sheets | 219/121.69 |

FOREIGN PATENT DOCUMENTS 174671 9/1985 Japan .

Primary Examiner—C. L. Albritton
Attorney, Agent, or Firm—Antonelli, Terry, Stout & Kraus

[57] ABSTRACT

A laser marking system of the present invention is provided with an irradiation position changing device on a laser beam path for changing the irradiation positions of the laser beam corresponding to each marking area when a marking area including a plurality of irradiation marking areas is formed by irradiating the workpiece with the pulse laser beam which has passed a pattern of a mask. The plurality of irradiation marking areas are successively irradiated with the pulse laser beam from an irradiation position to form a marking area. Since the marking area larger than each irradiation marking area can be obtained, the whole laser marking system can be made smaller in size without increasing the output power of the pulse laser generator.

27 Claims, 4 Drawing Sheets

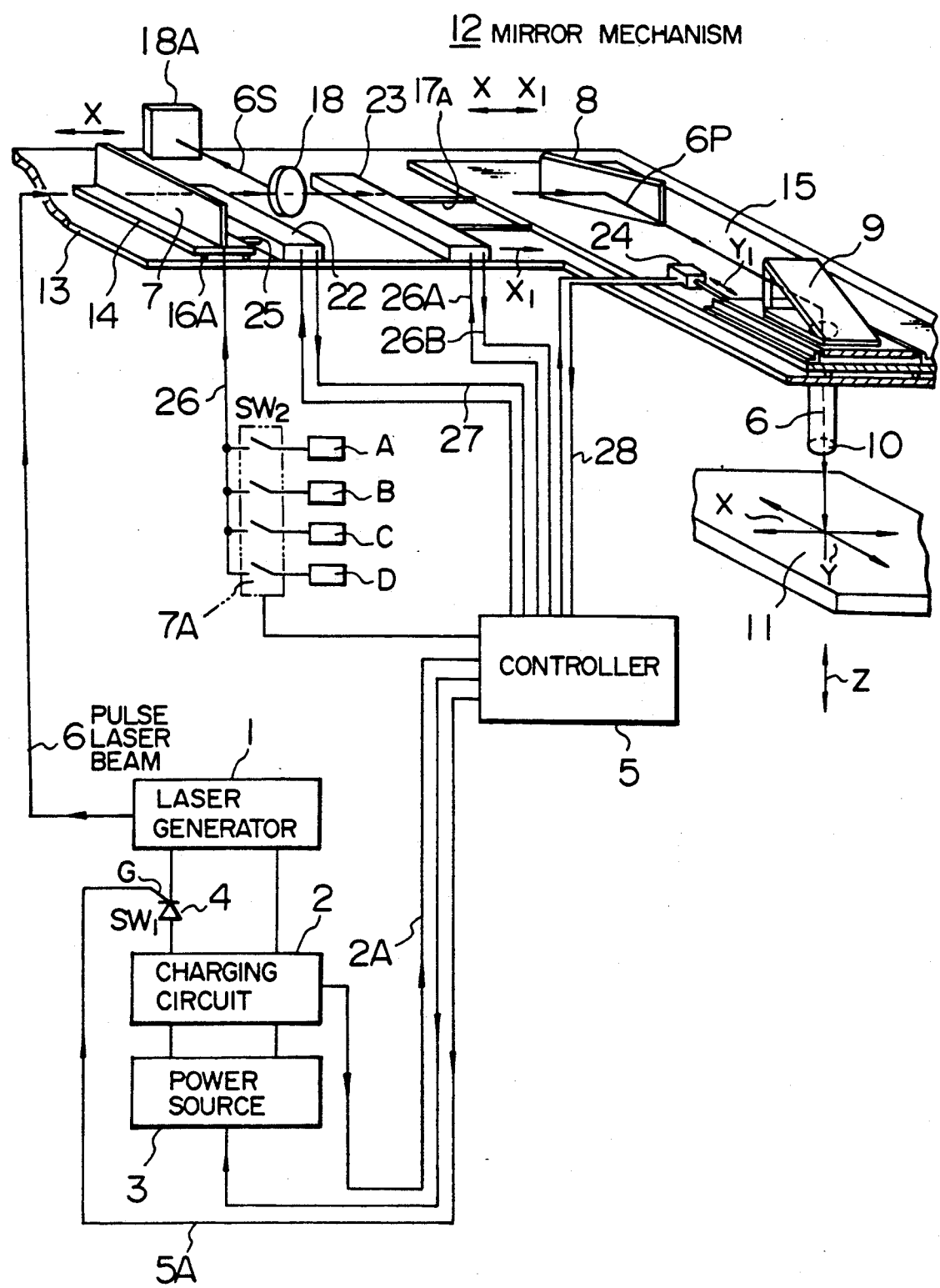

LASER MARKING SYSTEM

BACKGROUND OF THE INVENTION

The present invention relates to a laser marking system, and in particular, to a laser marking system for applying a marking on a workpiece.

Workpieces, such as electronic components are generally engraved with marks indicating such as manufacturing No., production date and designation for identifying the origin thereof. Engraving has heretofore been achieved by applying an ink coated stamp to the electronic components. This method has disadvantages that a long period of time is required to exchange the stamps and various pattern masks should be prepared since an appropriate stamp is selected every time when the electronic components are changed.

A laser marking apparatus disclosed in Japanese Unexamined Patent Publication JP-A-60-174671 comprises a liquid crystal mask using a liquid crystal element as a pattern mask, which is disposed between a laser generator and a workpiece. The liquid crystal mask is irradiated with a pulse laser beam from a pulse laser generator while a voltage is applied to a pattern of a display of the liquid crystal mask. Only the pattern of the pulse laser beam which has passed through the liquid crystal mask will pass through a polarization plate and will impinge upon the surface of the workpiece to mark the pattern thereon. Another laser marker is disclosed in U.S. Pat. No. 4,818,835.

In order to mark the workpiece with a pattern by using a large marking system, it is necessary to increase the output power of the laser generator. Accordingly, there is a disadvantage that a pulse laser generator having a high output.

SUMMARY OF THE INVENTION

It is an object of the present invention to provide a laser marking system which forms a marking area including a plurality of irradiation marking areas, larger than each irradiation marking area of the pulse laser beam and is compact in size.

It is another object of the present invention to provide a laser marking system which constantly marks a workpiece with a pattern at the same magnification even if the distance between a mask and an imaging lens is changed.

The features of the pulse laser system of the present invention are as follows: An irradiation position changing device is provided for changing the irradiation positions of the laser beam corresponding to each marking area when a marking area including a plurality of irradiation marking areas is formed by irradiating the workpiece with the pulse laser beam which has passed through a pattern of a mask. The plurality of irradiation marking areas are successively irradiated with the pulse laser beam from an irradiation position to form a marking area. Since the marking area larger than each irradiation marking area can be obtained, the whole laser marking system can be made smaller in size without increasing the output of the pulse laser generator.

BRIEF DESCRIPTION OF THE DRAWINGS

The present invention will be described in detail by way of an embodiment with reference to the drawings in which:

FIG. 1A is a schematic view showing an embodiment of a laser beam marking system of the present invention;

DESCRIPTION OF THE PREFERRED EMBODIMENTS

Figure 1B:
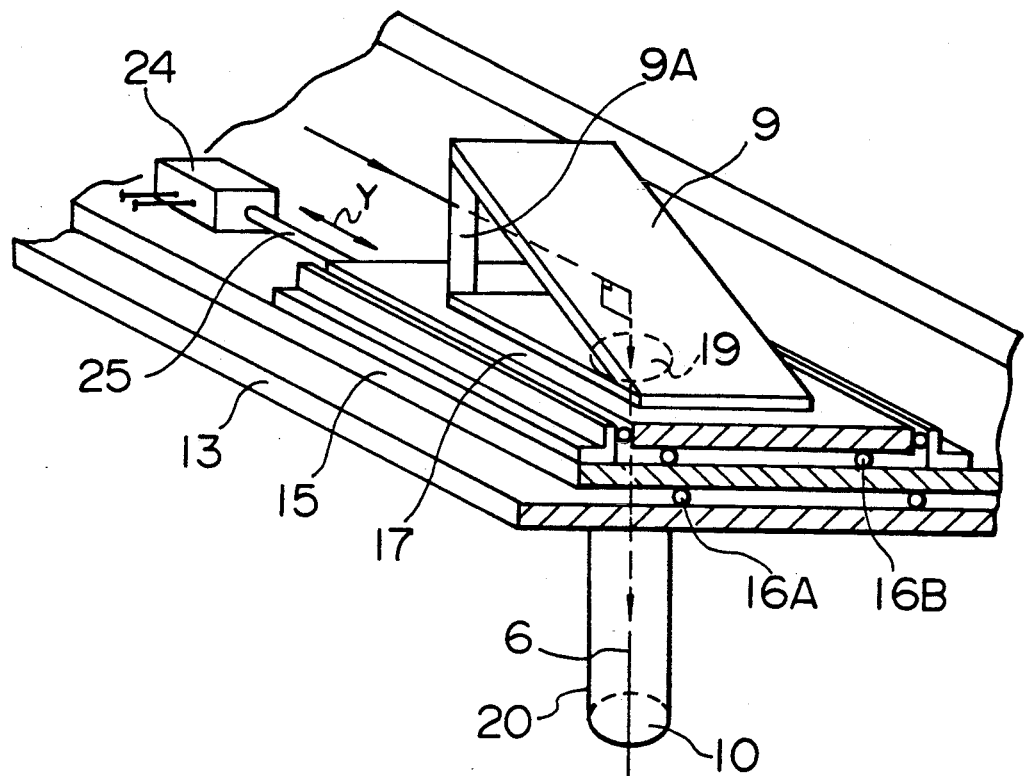
FIG. 1B is a partially perspective view showing the system of FIG. 1A in the vicinity of an X-axis movable base.

The present invention will be described by way of embodiments with reference to the drawings. A laser irradiation system of the present invention is formed as shown in FIGS. 1A and 1B.

A laser generator 1 is of a YAG type laser generator. The laser generator 1 is parallel-connected with a direct current power source circuit 3 and a charging circuit 2 to its terminals, respectively. A cathode electrode of a thyristor 4 is connected with one of the electrodes of the laser generator 1 and anode electrodes of the thyristor 4 is connected with the charging circuit 2. The gate electrode G of the thyristor 4 is connected with a controller 5. The charging circuit 2 is charged with electric charge by the d.c. power source 3 during a halt period of time $t_1$ of the laser generator 1. When the thyristor 4 is turned on through the gate G in response to a command from the controller 5, an electric current discharged from the charging circuit 2 flows across the electrodes of the laser generator 1 so that a laser medium therein is excited with a discharging light to emit a pulse laser beam 6.

The pulse laser beam 6 is transmitted through a liquid crystal mask 7 and is reflected by first and second mirrors 8 and 9 and impinges upon a surface of a workpiece 11. The surface of the workpiece 11 is marked with a pattern defined by the liquid crystal mask 7. The liquid crystal mask 7 and both mirrors and the like are mounted on an irradiation position changing apparatus 12.

The irradiation position changing apparatus 12 comprises the first mirror 8 which reflects the pulse laser beam 6 incident from the X-axis direction to the Y-axis direction and the second mirror 9 which reflects the pulse laser beam 6 incident from the Y-axis direction to the Z-axis direction and an image forming lens 10 which concentrates the pulse laser beam 6 from the second mirror 9. These components are mounted on a fixing base 13.

A liquid crystal base 14 and an X-axis movable base 15 are mounted on the fixing base 13 through rollers 16A. The liquid crystal mask 7 is supported on the liquid crystal base 14. The first mirror 8 and a Y-axis movable base 17 are supported on the X-axis movable base 15.

The Y-axis movable base 17 is movably mounted on the X-axis movable base 15 through rollers 16B so that it is movable in a direction normal to the X-axis movable base 15, that is, the Y-axis direction. The Y-axis movable base is provided with the second mirror 9. The second mirror 9 is supported on a support 9A provided on the Y-axis movable base 17. The fixing base 13, the X and Y-axes 15 and 17 are formed with a through-hole 19 through which the pulse laser beam 6 from the second mirror 9 is transmitted. The through-hole 19 is in communication with a lens cylinder 20. The lens cylinder 20 has an image forming lens 10 therein and is mounted on the Y-axis movable base 17.

A magnification adjusting driver 22 and an X-axis driver 23, are mounted on the fixing base 13 and a Y-axis driver 24 on the X-axis movable base 15.

The magnification adjusting driver 22, the X-axis driver 23 and the Y-axis driver 24 are linked with the liquid crystal base 14, the X-axis movable base 15 and the Y-axis movable base 17 through rods 17A, 25. These drivers comprise, for example, motors. The rods 17A, 25 are rotated by the rotation of the motors to move the liquid crystal base 14 and the X-axis movable base 15 in an X-axis direction and to move the Y-axis movable base 17 in an Y-axis direction.

The drivers have position sensors (not shown) incorporated therein. The position sensors input to the controller 5 position signals representative of the positions of the liquid crystal mask 7, both mirrors 8 and 9 and the like. The controller inputs a control signal to each driver to move the liquid crystal base and the like by a desired distance. The movement distance of the bases is controlled in such a manner.

Figure 3:
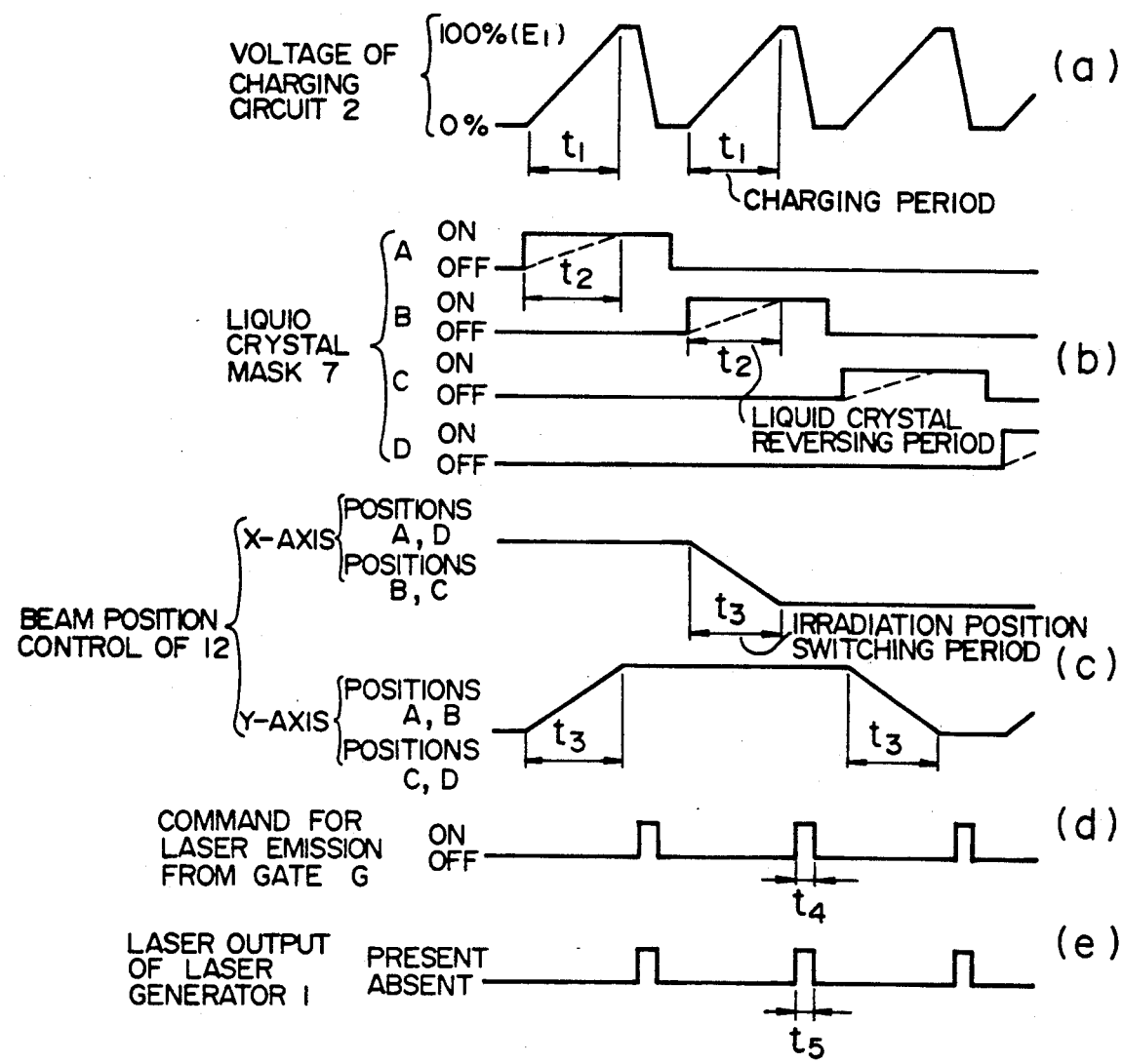
FIG. 3 is a time chart explaining the operation of the system.
Figure 4:
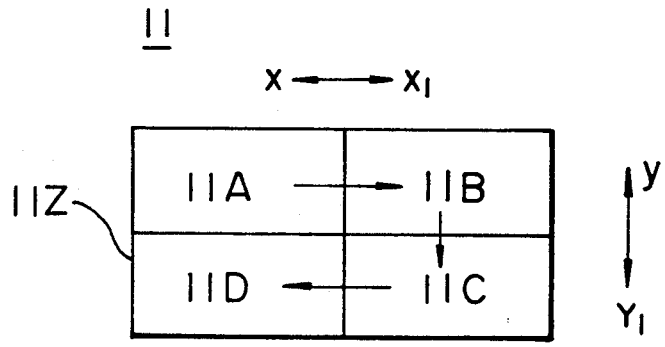
FIG. 4 is an elevational view of a workpiece.

A laser marking system of the present invention will now be described with reference to the drawings. In FIG. 3, abscissa t denotes time. Drive commands are inputted to the charging circuit 2 and the liquid crystal mask 7 from the controller 5. The liquid crystal mask 7 closes a liquid crystal switch 7A. The charging circuit 2 is charged for a charging period of time $t_1$, that is, with an irradiation energy of one shot pulse laser beam and the liquid crystal mask 7 takes a so-called reversing time $t_2$ which is required for liquid crystal molecules to rotate in a polarization direction for displaying pattern information, as shown in graphs (a) and (b) in FIG. 3. The periods of time $t_1$ and $t_2$ corresponds to an irradiation position changing time $t_3$ shown in a graph (c) of FIG. 3. The irradiation position changing apparatus 12 performs the following operation within the period of time $t_3$.

That is, when a drive command 26A is inputted from the controller 5 to the X-axis driver 23, the X-axis driver 23 drives the rods to rotate for moving the X-axis movable base 15 from a position X to a position X1. That is, the laser beam irradiation position is changed from a first area 11A to a second area 11B. Areas 11A through 11D represent irradiation marking areas. When changing of the irradiation positions is completed, a position moving completion signal 26B (not necessary if a calculation is accomplished in an operation unit) is inputted to the controller 5 by means of a sensor or position detection switch (not shown), or by changing the resistance depending upon the movement, or calculating the movement distance by the operation unit of the controller 5. The controller 5 drives the magnification adjusting driver 22 for the liquid crystal base 14 to move by a movement distance from the first area 11A to the second area 11B.

After accomplishing the magnification adjustment so that the pattern B becomes the same size as that of the pattern A, an adjustment completion signal 27 is inputted to the controller 5. If the controller 5 itself adjusts the size of the pattern so that the pattern B becomes the pattern A, the magnification adjusting driver could be omitted. The details of the magnification adjusting driver will be hereafter described. Then a signal 2A representative of a charging completion of the charging circuit 2 and a signal 26 representative of the display completion of the liquid crystal mask 7 are then inputted to the controller 5. It will suffice that the pattern display completion signal 26 controls the reversing time of the liquid crystal mask 7 in the controller.

This causes a signal 5A for turning on the thyristor to be applied to the gate G thereof from the controller 5 only for a period of time $t_4$ as shown in a graph (d) in FIG. 3 and a one-shot pulse laser beam 6 is emitted from the pulse laser generator 1 only for a period of time $t_5$ as shown in a graph (e) of FIG. 3. The pulse laser beam which has transmitted through the liquid crystal mask 7 is polarized into a P-polarized light 6P and an S-polarized light 6S. The S-polarized light 6S will be impinged by a beam splitter 18 upon a heat dissipation device 18A, which is outside of an optical path and is dissipated thereby. Only the P-polarized light 6P is reflected by both mirrors 8 and 9 for making the pattern B upon the second area 11B.

Since a similar operation is performed for marking patterns C and D on third and fourth areas 11C and 11D, respectively, description of them will be omitted herein.

In such a manner, the laser marking system of the present invention sequentially irradiates a workpiece 11 with the pulse laser beam 6 depending upon each of the irradiation marking areas 11A through 11D by switching the irradiation position switching device 12 to provide a marking area 11Z having an area larger than that of each of irradiation marking areas 11A, 11B, 11C and 11D without increasing the output of the pulse laser generator 1. Accordingly, the whole laser marking system can be made smaller in size.

Although the irradiation positions are changed by the irradiation position changing apparatus 12 in accordance with each of the areas 11A through 11D of the workpiece 11 to sequentially irradiate the workpiece 11 with the pulse laser beam 6, the workpiece 11 is marked with patterns. As a result of this, there is an advantage that whether or not the workpiece 11 at each of the areas 11A through 11D is precisely marked with a pattern can be readily determined.

In accordance with the present embodiment of the laser marking system of the present invention, the movement of the X-axis movable base 15 or Y-axis movable base 17 from the first area 11A to the second area 11B is completed within the charging time $t_1$ and the reversing time $t_2$ (only the reversing time if the reversing time is longer than the charging time). Accordingly, if switching of the irradiation position changing device 12 is completed within charging or reversing, the pulse laser beam can be emitted soon so that an efficient marking of the workpiece 11 can be achieved. This means that a one-shot of the marking workpiece with a pattern is repeated to provide a larger marking area.

The controller 5 outputs a turning-on signal to the gate G when the charging completion signal 2A and reversing completion signal (a signal representative of completion of counting of a preliminarily preset reversing completion time) and a switching completion detection signal 26B or 28 representative of completion of the movement of the movable base 15 or 17, that is, the switching of the irradiation position changing device are inputted thereto and an AND condition therebetween is established. The pulse laser beam 6 is emitted from the pulse laser generator 1. Therefore, disadvantages that the charging voltage is lacking, or an insufficient pattern is displayed and switching is insufficiently achieved are eliminated so that the workpiece 11 can be marked with clear patterns.

Furthermore, in the present invention, the charging period of time $t_1$ is matched with the reversing period of time $t_2$. As a result of this matching operation, since the charging time can be preset longer than the reversing time if the reversing time $t_2$ is longer than the charging time $t_1$, this offers an advantage that it is easier to control the charging time $t_1$.

Figure 2:
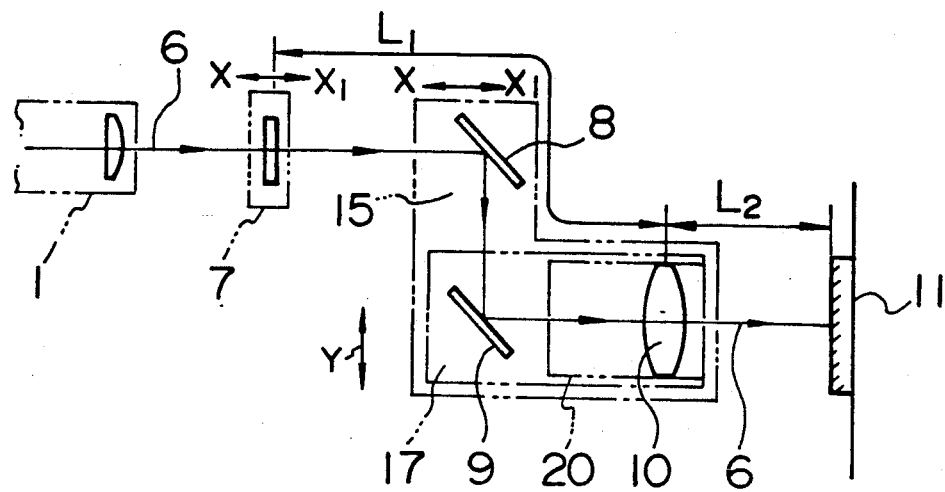
FIG. 2 is a schematic view showing the operation of the system of FIG. 1A.

A way of adjusting the magnification of the magnification adjustment driver 22 in the present embodiment will be described with reference to FIG. 2. If the pattern A is marked on the first area 11A, $l_1/l_2$ would be 3 when $l_1$ and $l_2$ are 300 and 100 (mm), respectively wherein $l_1$ denotes the distance between the liquid crystal mask 7 and the image forming lens 10 and $l_2$ denotes the distance between the lens 10 and the surface of the workpiece 11. That is, the scale of the pattern A of the liquid crystal mask 7 would be reduced 3 times and marked on the first area 11A.

When the pattern B is marked on the second area 11B, the X-axis movable base 15 is moved from X to $X_1$. If the movement distance at this time is, for example, 30 (mm), $l_1/l_2$ would not become 3.

Hence, when the liquid crystal base 14 is, moved in the same direction and by the same distance as those of the X-axis movable base 15 by driving the magnification adjusting driver 22 in accordance with the present invention, the ratio of reduction in size would be 3 since the movement distance $l_1 = 330 - 30$ (mm).

In order to mark patterns A through D on the first area 11A through the other areas 11B through 11D, the liquid crystal base 22 is moved in the same direction by the same distance as those of the X-axis and Y-axis movable bases 15 and 16 by driving the magnification adjusting driver 22 to correct the distances between the bases for providing constant distances therebetween. Since a plurality of patterns can be marked in substantially same size, the quality of marking is enhanced.

Since the liquid crystal base 14 which is lighter than the X-axis movable base 15 is driven by the magnification adjusting driver 22 in the present embodiment, control of driving and stopping of the liquid crystal base 14 can be readily achieved.

Figure 5:
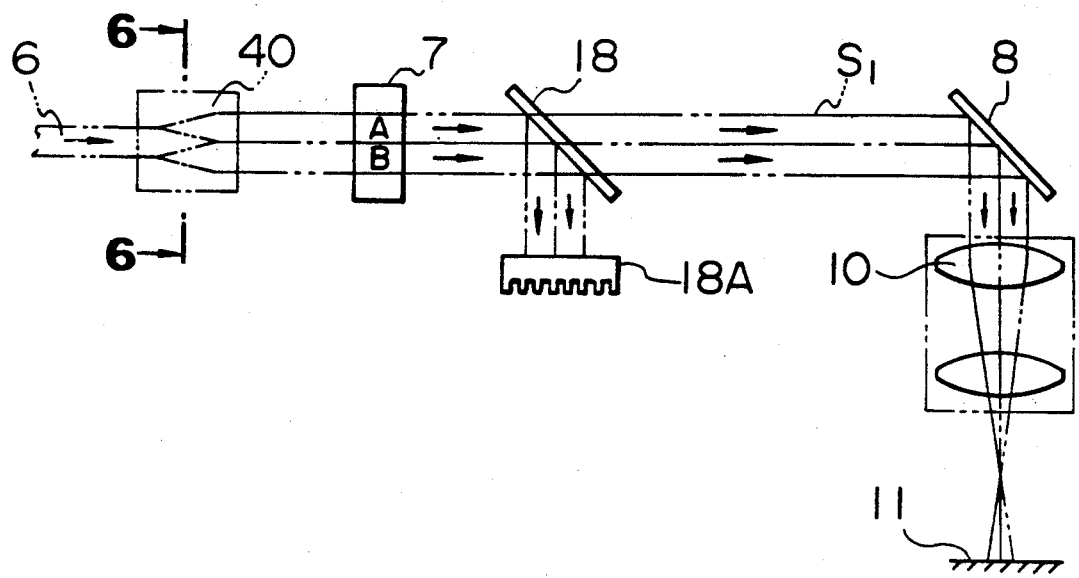
FIG. 5 is a perspective explanatory view showing another embodiment of a laser beam marking system of the present invention.

In the embodiment of FIG. 5, a laser beam irradiation position changing device 40 which changes the direction of a pulse laser beam 6 generated from a pulse laser generator 1 into a plurality of directions is disposed on the incident optical path for the mask 7.

Figure 6:
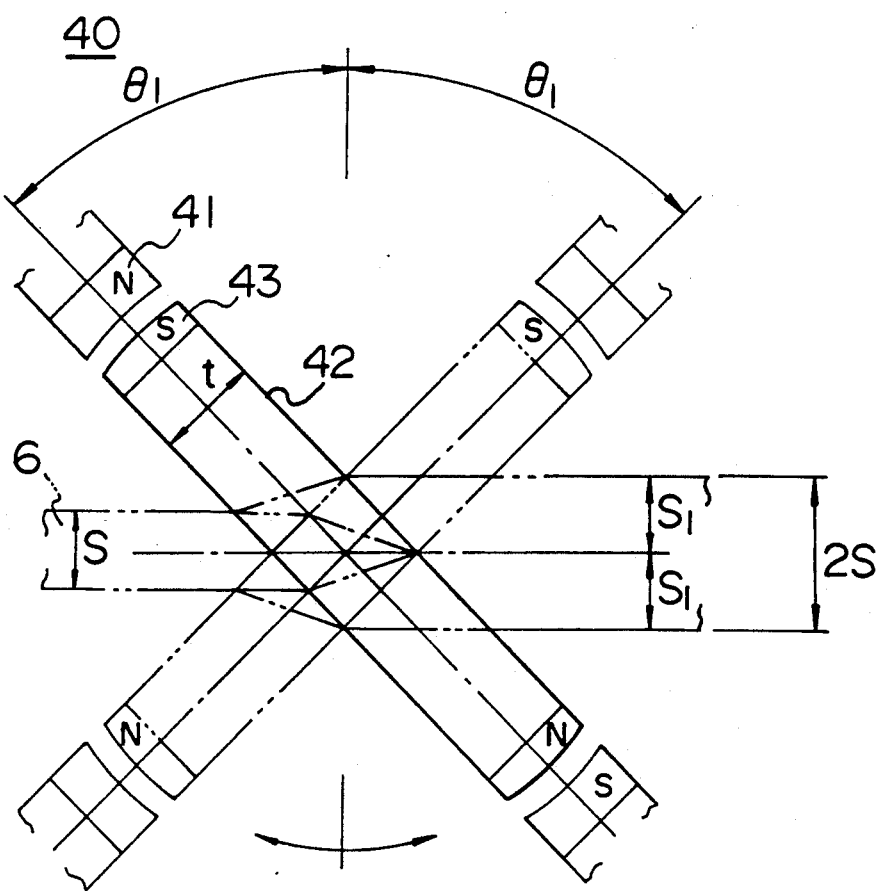
FIG. 6 is a sectional view taken along a line A—A in FIG. 5 showing laser beam switching device used in FIG. 5.

Specifically, the irradiation position changing device 40 comprises a plurality of magnets, for example, N poles 41 located along the circumferential periphery as shown in FIG. 6. A blade 42 made of quartz glass having a thickness t is disposed at inner side of the peripheral N poles. A rotary driver, for example, a motor (not shown) is provided at the front or rear side of the blade 42 as viewed in the drawing. The blade 42 is rotated in directions of arrows $\theta_1$ by the motor and is provided with magnets, for example, S pole 43 at the outer peripheral ends thereof.

When the blade 42 is moved to a position represented by a solid line by the attraction between the N pole 41 and S pole 43, the pulse laser beam 6 is refracted into an upper pulse laser beam $s_1$ by the blade 42 as represented by a solid line to irradiate the pattern A of the mask 7. When the blade 42 is moved to a dot and chain line by rotating the motor in a clockwise direction, the direction of the pulse laser beam 6 is changed to the opposite direction to become a lower pulse laser beam $S_1$ to irradiate the pattern B. The optical path of the pulse laser beam 6 is merely changed by providing a plurality of electromagnets having S and N poles along the outer periphery of the blade 42 and rotating the blade 42 so that the mask 7 is irradiated with the pulse laser beam 6 on each emission of the beam. An irradiated marking area is thus formed at each of a plurality of areas of the workpiece 11. The total marking area can not only be made larger than that of each irradiated marking area without increasing the output of the pulse laser generator 1, but also the structure can be simplified since the irradiation position changing device 40 can irradiate each area of the workpiece 11 with the pulse laser beam 6 by merely rotating the blade 42.

If the irradiation position changing device 40 is disposed on the incident beam path of the mask 7, it would suffice to switch the irradiation position changing device 40 to each area while displaying all patterns of the mask 7. Accordingly, necessity of the switching of the mask 7 is eliminated so that the period of life time of the mask 7 can be extended.

If the irradiation position changing device 40 is disposed on the transmitted optical path, it would be necessary to match a display portion of the pattern of the mask 7 with a portion at which the laser beam can reach by means of the irradiation position changing device 40.

Although the liquid crystal mask has been described in the above mentioned embodiment, a metallic mask having a pattern of holes which are formed by punching a metallic plate or a mechanic mask such as a mask having on the glass surface thereof a coating which reflects a laser beam may be used in lieu of the liquid crystal mask. Working time can be saved if the irradiation position changing device is switched during marking of a pattern by using a mechanical mask.

In such a manner, in accordance with the laser marking system of the present invention, an irradiation position changing device is provided for changing the irradiation positions of the laser beam corresponding to a marking area including a plurality of irradiation marking areas is formed by irradiating the workpiece with the pulse laser beam which has passed a pattern of a mask. The plurality of irradiation marking areas are successively irradiated with the pulse laser beam from an irradiation position to form a marking area. Since the marking area larger than each irradiation marking area can be obtained, the whole laser marking system can be made smaller in size without increasing the output of the pulse laser generator.

What is claimed is:

1. A laser marking apparatus for applying patterns to a workpiece by irradiating a mask having patterns with a laser beam from a pulse laser generator, and irradiating a workpiece with the laser beam which has passed through the mask to form a marking area including a plurality of irradiation marking areas, said laser marking apparatus comprising irradiation position changing means provided on a path of said laser beam for changing an irradiation position of the pulse laser beam corresponding to each irradiation marking area of the workpiece, wherein said irradiation position changing means comprises an X-axis movable base which moves in a laser beam travelling direction along the laser beam path between said mask and said workpiece; a first mirror mounted on said X-axis movable base for reflecting said laser beam incident from the X direction to the normal direction of the X direction; a second mirror for reflecting the laser beam incident from the first mirror to a direction toward the workpiece; and a Y-axis movable base which mounts the second mirror thereon and moves in a Y-axis direction.

2. A laser marking apparatus for applying patterns to a workpiece by irradiating a mask having patterns with a laser beam from a pulse laser generator, and irradiating a workpiece with the laser beam which has passed through the mask to form a marking area including a plurality of irradiation marking areas, said laser marking apparatus comprising irradiation position changing means provided on a path of said laser beam for changing an irradiation position of the pulse laser beam corresponding to each irradiation marking area of the workpiece, and a magnification adjusting means disposed in said laser beam path and for moving the mask to a position of each of irradiation marking areas which is changed by said irradiation position changing means in order to provide a constant distance between the mask and an image forming lens disposed in front of said workpiece.

3. A laser marking apparatus as defined in claim 1 comprising a magnification adjusting means disposed in said laser beam path and for moving the mask to a position of each of irradiation marking areas which is changed by said irradiation position changing means in order to provide a constant distance between the mask and an image forming lens disposed in front of said workpiece.

4. A laser marking method for applying patterns on a workpiece including the steps of irradiating a mask having the pattern with a laser beam from a pulse laser generator, and irradiating a workpiece with the laser beam which has passed through the mask to form a marking area including a plurality of irradiation marking areas, said laser marking method comprising the step of providing a substantially constant distance between the mask and an image forming lens disposed in front of said workpiece for forming a pattern having a substantially same size on said workpiece by moving of a magnification adjusting device after switching a state of an irradiation changing device disposed in a path of said laser beam corresponding to each irradiation marking area.

5. A laser marking apparatus for applying patterns on a workpiece by irradiating a mask having patterns with a laser beam from a pulse laser generator, and irradiating a workpiece with the laser beam which has passed through the mask to form a marking area including a plurality of irradiation marking areas, said laser marking apparatus comprising an irradiation position changing means disposed in the path of said laser beam upstream of said mask and including a transmission member for transmitting said laser beam and a rotor for rotating the transmission member mounted thereon thereby to change the irradiation position of said laser beam on the mask.

6. A laser marking apparatus for applying patterns on a workpiece by irradiating a mask having patterns with a laser beam from a pulse laser generator, and irradiating a workpiece with the laser beam which has passed through the mask to form a marking area including a plurality of irradiation marking areas, said laser marking apparatus comprising an irradiation position changing means disposed in a path of said laser beam for adjusting an irradiation position of said pulse laser beam corresponding to each irradiation marking area on the workpiece, a charging circuit for charging said pulse laser generator, and means for outputting a discharging command to said charging circuit in response to the satisfaction of an AND condition of completion of said charging of the pulse laser generator or completion of display of patterns on said mask and completion of the irradiation position changing of said irradiation position changing device.

7. A laser marking apparatus as defined in claim 2 comprising a charging circuit for charging said pulse laser generator, and means for outputting a discharging command to said charging circuit in response to an predetermined condition of completion of charging of said pulse laser generator by said charging circuit, completion of display of patterns on said mask, completion of irradiation position changing of said irradiation position changing device and completion of adjusting of said magnification adjusting device.

8. A laser marking apparatus as defined in claim 3 comprising a charging circuit for charging said pulse laser generator, and means for outputting a discharging command to said charging circuit in response to an predetermined condition of completion of charging of said pulse laser generator by said charging circuit, completion of display of patterns on said mask, completion of irradiation position changing of said irradiation position changing device and completion of adjusting of said magnification adjusting device.

9. A laser marking apparatus as defined in claim 8, said irradiation position changing means being switched during charging of said charging circuit or during displaying of patterns.

10. A laser marking apparatus for applying patterns to a workpiece by irradiating a mask having patterns with a laser beam from a pulse laser generator, and irradiating a workpiece with the laser beam which has passed through the mask to form a marking area including a plurality of irradiation marking areas, said laser marking apparatus comprising irradiation position changing means provided on a path of said laser beam for changing an irradiation position of the pulse laser beam corresponding to each irradiation marking area of the workpiece, and said mask comprising a liquid crystal mask which electrically displays patterns.

11. A laser marking apparatus as defined in claim 1, said mask comprising a liquid crystal mask which electrically displays patterns.

12. A laser marking apparatus as defined in claim 2, said mask comprising a liquid crystal mask which electrically displays patterns.

13. A laser marking apparatus as defined in claim 3, said mask comprising a liquid crystal mask which electrically displays patterns.

14. A laser marking apparatus as defined in claim 4, said mask comprising a liquid crystal mask which electrically displays patterns.

15. A laser marking apparatus as defined in claim 5, said mask comprising a liquid crystal mask which electrically displays patterns.

16. A laser marking apparatus as defined in claim 6, said mask comprising a liquid crystal mask which electrically displays patterns.

17. A laser marking apparatus as defined in claim 7, said mask comprising a liquid crystal mask which electrically displays patterns.

18. A laser marking apparatus as defined in claim 8, said mask comprising a liquid crystal mask which electrically displays patterns.

19. A laser marking apparatus as defined in claim 1, said mask comprising a metallic mask having holes which form patterns.

20. A laser marking apparatus as defined in claim 2, said mask comprising a metallic mask having holes which form patterns.

21. A laser marking apparatus as defined in claim 3, said mask comprising a metallic mask having holes which form patterns.

22. A laser marking apparatus as defined in claim 4, said mask comprising a metallic mask having holes which form patterns.

23. A laser marking apparatus as defined in claim 5, said mask comprising a metallic mask having holes which form patterns.

24. A laser marking apparatus as defined in claim 6, said mask comprising a metallic mask having holes which form patterns.

25. A laser marking apparatus as defined in claim 7, said mask comprising a metallic mask having holes which form patterns.

26. A laser marking apparatus as defined in claim 8, said mask comprising a metallic mask having holes which form patterns.

27. A laser marking apparatus comprising an irradiation position changing means comprising an X-axis movable base which moves in a laser beam travelling direction along a laser beam path between a mask and a workpiece; a first mirror mounted on the X-axis movable base for reflecting an X direction laser beam to the normal direction; a second mirror for reflecting the laser beam from the first mirror in a direction toward said workpiece; and a Y-axis movable base which mounts said second mirror thereon and moves in a Y-axis direction.

* * * * *